US012681260B2

(12) United States Patent
Sakakibara et al.

(10) Patent No.: US 12,681,260 B2
(45) Date of Patent: Jul. 14, 2026

(54) LENS BARREL, CAMERA COMPRISING SAME, AND ROTATIONAL POSITION SENSING DEVICE

(71) Applicant: Panasonic Intellectual Property Management Co., Ltd., Osaka (JP)

(72) Inventors: Takeshi Sakakibara, Osaka (JP); Naoki Yoshikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 605 days.

(21) Appl. No.: 18/096,139

(22) Filed: Jan. 12, 2023

(65) Prior Publication Data

US 2024/0085658 A1 Mar. 14, 2024

(30) Foreign Application Priority Data

Sep. 13, 2022 (JP) ................................. 2022-145466

(51) Int. Cl.
*G02B 7/04* (2021.01)
*G01D 5/245* (2006.01)
*G02B 7/02* (2021.01)

(52) U.S. Cl.
CPC ............... *G02B 7/04* (2013.01); *G01D 5/245* (2013.01); *G02B 7/021* (2013.01)

(58) Field of Classification Search
USPC ......................................................... 349/825
See application file for complete search history.

(56) References Cited

U.S. PATENT DOCUMENTS 5,576,894 A * 11/1996 Kuwana .................... G02B 7/10
                                                        359/824
6,819,501 B2 11/2004 Nakamura
2003/0107821 A1 6/2003 Nakamura

FOREIGN PATENT DOCUMENTS

JP H06-265771 A 9/1994
JP H10-221588 A 8/1998
JP 2000-330066 A 11/2000
(Continued)

OTHER PUBLICATIONS

Notice of Reasons for Refusal mailed Mar. 3, 2026 in corresponding Japanese Patent Application No. 2022-145466, with Machine Translation.

*Primary Examiner* — Dung T Nguyen
(74) *Attorney, Agent, or Firm* — Renner, Otto, Boisselle & Sklar, LLP

(57) ABSTRACT

A lens barrel 100 includes a fifth lens group unit 25, a focus ring 31, an internal gear 31b, a pinion gear 41, a detection magnet 43, and a GMR sensor 44. The internal gear 31b rotates integrally with the focus ring 31 and has a plurality of gear portions 31c. The pinion gear 41 is provided on the inner peripheral surface side of the focus ring 31 and has a gear portion 41a that mates with the gear portion 31c of the internal gear 31b, and a guide shaft 42 that is inserted through the center of the gear portion 41a. The guide shaft 42 is inserted through the detection magnet 43, and the detection magnet 43 rotates integrally with the gear portion 41a and has a magnetized surface 43b on which different magnetic poles are alternately magnetized. The GMR sensor 44 is fixed to a member separate from the detection magnet 43, is provided at a position adjacent to the detection magnet 43, and detects the rotation of the detection magnet 43 that rotates along with the pinion gear 41.

14 Claims, 11 Drawing Sheets

(56)     References Cited

FOREIGN PATENT DOCUMENTS

| JP | 2003-177298 | A | 6/2003 |
| JP | 2018-005087 | A | 1/2018 |
| JP | 2018-151500 | A | 9/2018 |

* cited by examiner

LENS BARREL, CAMERA COMPRISING SAME, AND ROTATIONAL POSITION SENSING DEVICE

CROSS-REFERENCE TO RELATED APPLICATIONS

This application claims priority to Japanese Patent Application No. 2022-145466 filed on Sep. 13, 2022. The entire disclosure of Japanese Patent Application No. 2022-145466 is hereby incorporated herein by reference.

BACKGROUND

Technical Field

The present disclosure relates to a lens barrel including a focus ring or other such manual operation ring, as well as to a camera including this lens barrel, and a rotational position sensing device.

Description of the Related Art

In general, a lens barrel provided with manual operation rings, such as a focus ring and a zoom ring, is used while attached to a camera body.

With a lens barrel provided with such manual operation rings, a photo-interrupter, a photo-reflector, or another such sensing means is used to sense the position of a manual operation ring.

For example, Patent Literature 1 discloses a displacement sensing device that has a magnetic scale having a magnetized surface on which different magnetic poles are alternately magnetized, and an MR sensor disposed opposite the magnetic scale at a specific gap, this displacement sensing device being configured such that either the magnetic scale or the MR sensor is interlocked with a moving body, an output signal produced by the relative movement of the MR sensor and the magnetic scale accompanying the movement of the moving body is detected, and the position of the moving body is sensed, wherein the magnetic scale and the MR sensor that is disposed opposite the magnetic scale at a specific gap are unitized via a single member.

CITATION LIST

Patent Literature

Patent Literature 1: JP-A 2003-177298

SUMMARY

Problem to be Solved by the Disclosure

However, the following problem is encountered with the conventional displacement sensing device described above.

Specifically, with the displacement sensing device disclosed in the above-mentioned publication, although sensing resolution can be improved as compared with a conventional displacement sensing mechanism featuring a photo-interrupter, a dedicated member (casing member) is required for unitizing the magnetic scale and the MR sensor.

It is an object of the present disclosure to provide a lens barrel with which the resolution of rotation sensing can be improved without making the structure complicated, as well as a camera including this lens barrel.

Means for Solving Problem

The lens barrel disclosed herein includes a movable lens frame, a manual operation ring, a first gear unit, a second gear unit, a detection magnet, and a rotation sensor. The movable lens frame holds a lens and is able to move back and forth in the optical axis direction. The manual operation ring is a substantially annular member and is rotated to move the movable lens frame in the optical axis direction. The first gear unit is provided on the inner peripheral surface side of the manual operation ring, rotates integrally with the manual operation ring, and has a plurality of first gear portions that project inward in the radial direction of the manual operation ring. The second gear unit is provided on the inner peripheral surface side of the manual operation ring and has a second gear portion that mates with the first gear portion of the first gear unit, and a rotating shaft that is inserted through the center of the second gear portion. The rotating shaft is inserted into the detection magnet, and the detection magnet rotates integrally with the second gear portion and has a magnetized surface on which different magnetic poles are magnetized alternately. The rotation sensor is fixed to a member separate from the detection magnet, is provided at a position adjacent to the detection magnet, and senses the rotation of the detection magnet that rotates along with the second gear portion.

Effects

With the lens barrel disclosed herein, the resolution of rotation sensing can be improved without making the structure complicated.

DETAILED DESCRIPTION OF THE EMBODIMENT

An embodiment will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 100 and a camera 1 including the lens barrel 100 according to an embodiment of the present disclosure will now be described with reference to FIGS. 1 to 10.

(1) Configuration of Lens Barrel 100

Figure 1:
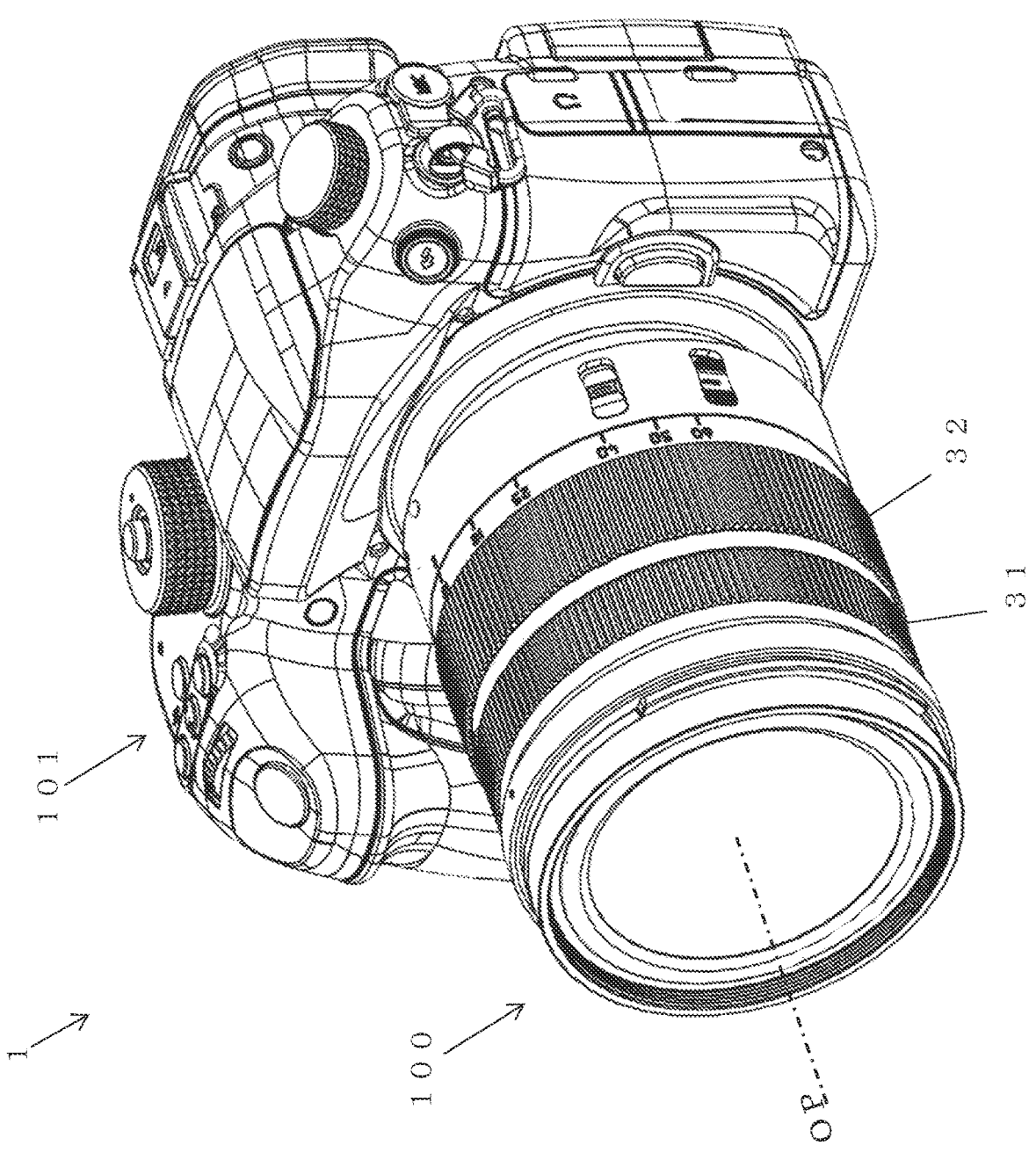
FIG. 1 is an overall oblique view of the configuration of a camera in which a lens barrel according to an embodiment of the present disclosure is mounted to a camera body.

The configuration of the lens barrel 100 according to an embodiment of the present disclosure will now be described with reference to the drawings. FIG. 1 is an oblique view of the camera 1, in which the lens barrel 100 according to this embodiment is mounted to a camera body 101.

As shown in FIG. 1, the lens barrel 100 is a telescoping lens barrel that is detachably attached to the camera body 101.

Figure 2:
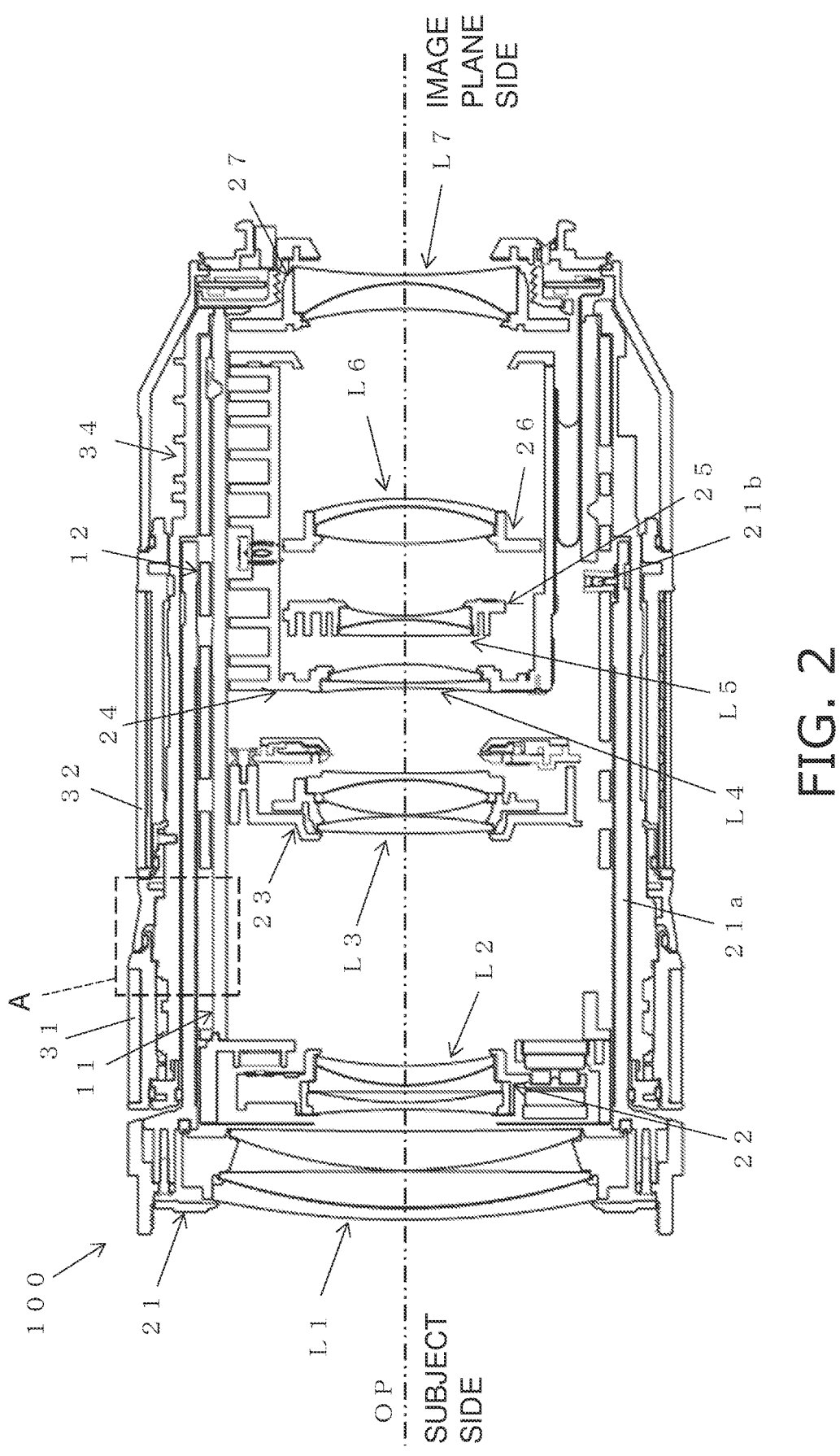
FIG. 2 is a cross-sectional view of the lens barrel in FIG. 1.
Figure 3A:
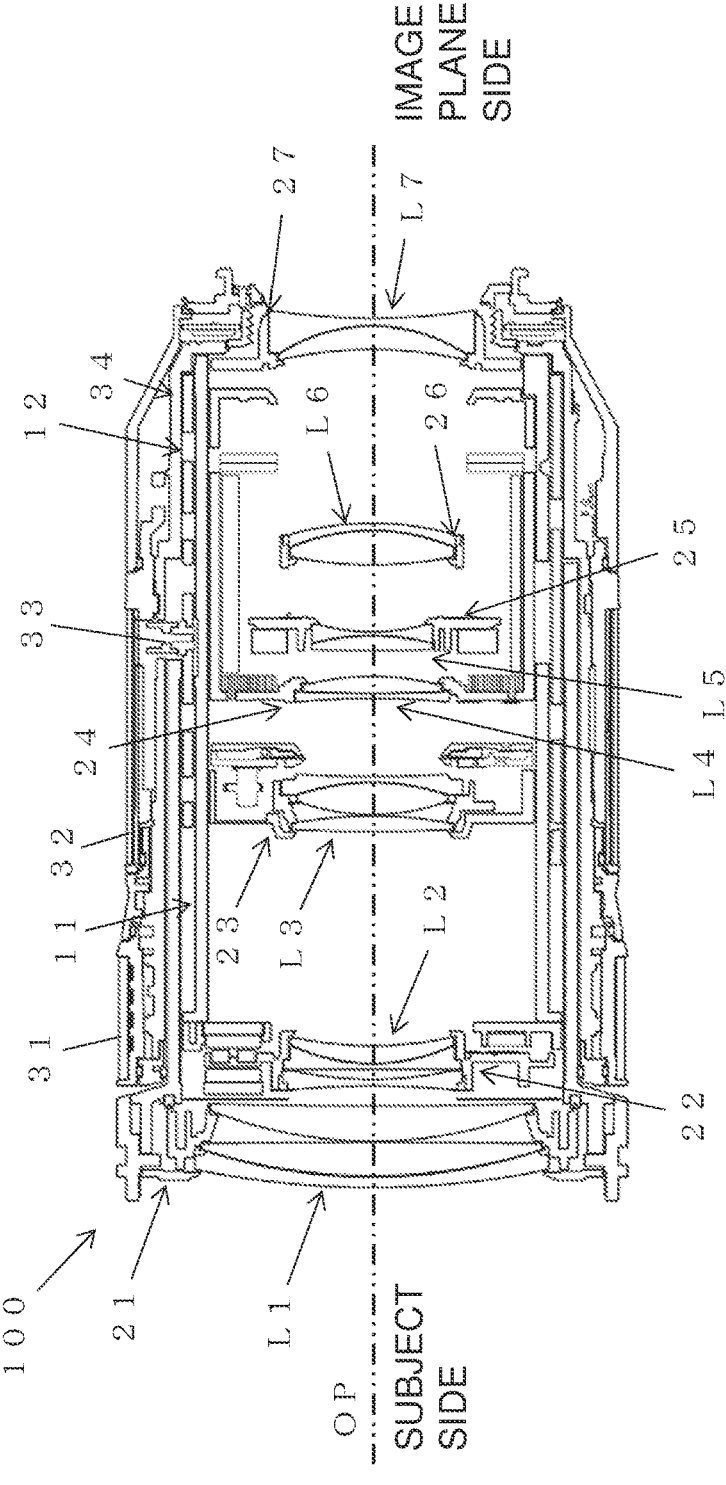
FIG. 3A is a cross-sectional view of a state in which the lens barrel of FIG. 2 is in its wide position.
Figure 3B:
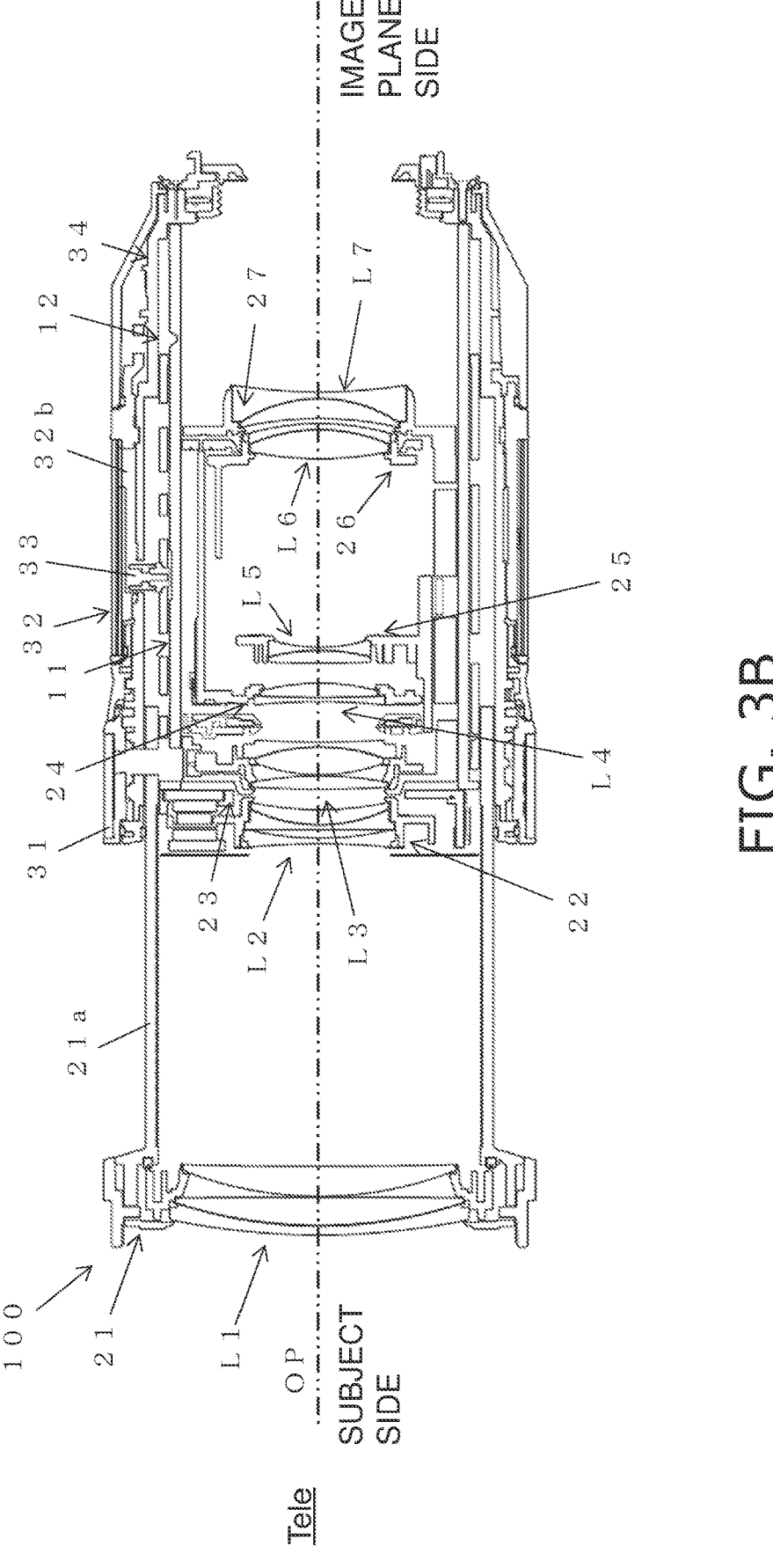
FIG. 3B is a cross-sectional view of a state in which the lens barrel of FIG. 2 is in its telephoto position.

As shown in FIG. 2, the lens barrel 100 mainly includes a rectilinear barrel (fixed barrel) 11, a cam barrel 12, a first lens group unit 21, a second lens group unit 22, a third lens group unit 23, a fourth lens group unit 24, a fifth lens group unit (movable lens frame) 25, a sixth lens group unit 26, a seventh lens group unit 27, a focus ring (manual operation ring) 31, a zoom ring 32, and a base frame 34.

The rectilinear barrel (fixed barrel) 11 is a substantially cylindrical member, and holds the second to sixth lens group units 22 to 26 on the inner peripheral surface thereof so these units are able to move in the direction of the optical axis OP.

The cam barrel 12 is disposed on the outer peripheral surface side of the substantially cylindrical rectilinear barrel 11 described above, and a plurality of cam grooves are formed in a substantially cylindrical main body. When the cam barrel 12 is rotated with respect to the rectilinear barrel 11, cam followers provided on the rectilinear barrel 11 side move along the cam grooves formed in the cam barrel 12, so that the cam barrel 12 moves back and forth in the optical axis OP direction.

The first lens group unit 21 is a substantially cylindrical member disposed on the outer peripheral surface side of the rectilinear barrel 11, and as shown in FIG. 2, holds a first lens group lens L1 at the end on the subject side in the optical axis OP direction. The first lens group unit 21 is disposed closest to the subject in the optical axis OP direction of the lens barrel 100.

As shown in FIG. 2, the first lens group unit 21 has a substantially cylindrical main body portion 21a and a cam follower 21b provided on the inner peripheral surface of the substantially cylindrical main body portion 21a.

The cam follower 21b of the first lens group unit 21 is provided so as to protrude inward in the radial direction from the outer peripheral surface, near the end on the subject side of the inner peripheral surface of the substantially cylindrical main body portion 21a. The cam follower 21b is engaged with a rectilinear groove formed in the rectilinear barrel 11 and a cam groove formed in the cam barrel 12, and as the cam barrel 12 is rotated, the first lens group unit 21 is moved back and forth in the optical axis OP direction.

The second lens group unit 22 is a substantially annular member enclosed on the inner peripheral surface side of the rectilinear barrel 11, and holds a second lens group lens L2, as shown in FIG. 2. The second lens group unit 22 is disposed between the first lens group unit 21 and the third lens group unit 23 in the optical axis OP direction of the lens barrel 100. The second lens group unit 22 is fixed to the end surface on the subject side of the rectilinear barrel 11 with screws (not shown).

The third lens group unit 23 is a substantially annular member enclosed on the inner peripheral surface side of the rectilinear barrel 11, and holds a third lens group lens L3, as shown in FIG. 2. The third lens group unit 23 is disposed between the second lens group unit 22 and the fourth lens group unit 24 in the optical axis OP direction of the lens barrel 100.

The third lens group unit 23 has a cam follower that protrudes outward in the radial direction from the outer peripheral surface.

The fourth lens group unit 24 is a substantially cylindrical member enclosed on the inner peripheral surface side of the rectilinear barrel 11, and holds a fourth lens group lens L4, as shown in FIG. 2. The fourth lens group unit 24 is disposed between the third lens group unit 23 and the fifth lens group unit 25 in the optical axis OP direction of the lens barrel 100. The fourth lens group unit 24 has a cam follower that protrudes outward in the radial direction from the outer peripheral surface.

The fifth lens group unit (movable lens frame) 25 is a substantially annular member enclosed on the inner peripheral surface side of the rectilinear barrel 11, and holds a fifth lens group lens (focus lens) L5, as shown in FIG. 2. The fifth lens group unit 25 is disposed between the fourth lens group unit 24 and the sixth lens group unit 26 in the optical axis OP direction of the lens barrel 100. The fifth lens group unit 25 is attached to the fourth lens group unit 24 in a state of being suspended by a guide shaft (not shown) one end of which is attached to the fourth lens group unit 24.

The sixth lens group unit 26 is a substantially annular member enclosed on the inner peripheral surface side of the rectilinear barrel 11, and holds a sixth lens group lens L6, as shown in FIG. 2. The sixth lens group unit 26 is disposed between the fifth lens group unit 25 and the seventh lens group unit 27 in the optical axis OP direction of the lens barrel 100. Like the fifth lens group unit 25, the sixth lens group unit 26 is attached to the fourth lens group unit 24 in a state of being suspended by a guide shaft (not shown).

The seventh lens group unit 27 is a substantially annular member enclosed on the inner peripheral surface side of the rectilinear barrel 11, and holds a seventh lens group lens L7, as shown in FIG. 2. The seventh lens group unit 27 is disposed on the image plane side, which is on the opposite side from the subject side in the optical axis OP direction of the lens barrel 100.

The seventh lens group unit 27 has a cam follower that protrudes outward in the radial direction from the outer peripheral surface.

Here, the first to seventh lens group lenses L1 to L7 held in the first to seventh lens group units 21 to 27 are disposed in that order, starting from the subject side, with the optical axis OP as the center axis. The first to seventh lens group units 21 to 27 are moved back and forth in the optical axis OP direction, between the wide position shown in FIG. 3A and the telephoto position shown in FIG. 3B, by rotating a zoom ring 32 (discussed below).

That is, the lens barrel 100 is configured such that when the zoom ring 32 rotatably attached to the outer peripheral surface of the base frame 34 is rotated, the cam barrel 12 rotates along with the rotation of the zoom ring 32. In the lens barrel 100, when the cam barrel 12 rotates, the first to seventh lens group units 21 to 27 are driven back and forth in the optical axis OP direction.

Here, a lens barrel equipped with a lens having a shallow depth of field, such as a macro lens, requires a resolution finer than the current sensing resolution.

The term "depth of field" means the range that appears in focus front and rear to the human eye, when the focus is adjusted to a point on the subject through the lens during photography, but strictly speaking only that one point is in focus.

The lens barrel 100 of this embodiment includes the fifth lens group unit 25, the focus ring 31, an internal gear 31*b*, a pinion gear 41, a detection magnet 43, and a GMR (giant magneto-resistive effect) sensor 44. The fifth lens group unit 25 holds the fifth lens group lens L5 and moves back and forth in the optical axis direction. The focus ring 31 is a substantially annular member, and is rotated to move the fifth lens group unit 25 in the optical axis direction. The internal gear 31*b* is provided on the inner peripheral surface side of the focus ring 31, rotates integrally with the focus ring 31, and has a plurality of gear portions 31*c* protruding inward in the radial direction of the focus ring 31. The pinion gear 41 is provided on the inner peripheral surface side of the focus ring 31, and has gear portions 41*a* that mate with the gear portions 31*c* of the internal gear 31*b*, and a guide shaft 42 that is inserted through the center of the gear portions 41*a*. The guide shaft 42 is inserted through the detection magnet 43, and the detection magnet 43 rotates integrally with the gear portions 41*a* and has a magnetized surface 43*b* on which different magnetic poles are magnetized alternately. The GMR sensor 44 is fixed to a member separate from the detection magnet 43, is provided at a position adjacent to the detection magnet 43, and senses the rotation of the detection magnet 43 rotating along with the pinion gear 41.

Figure 4:
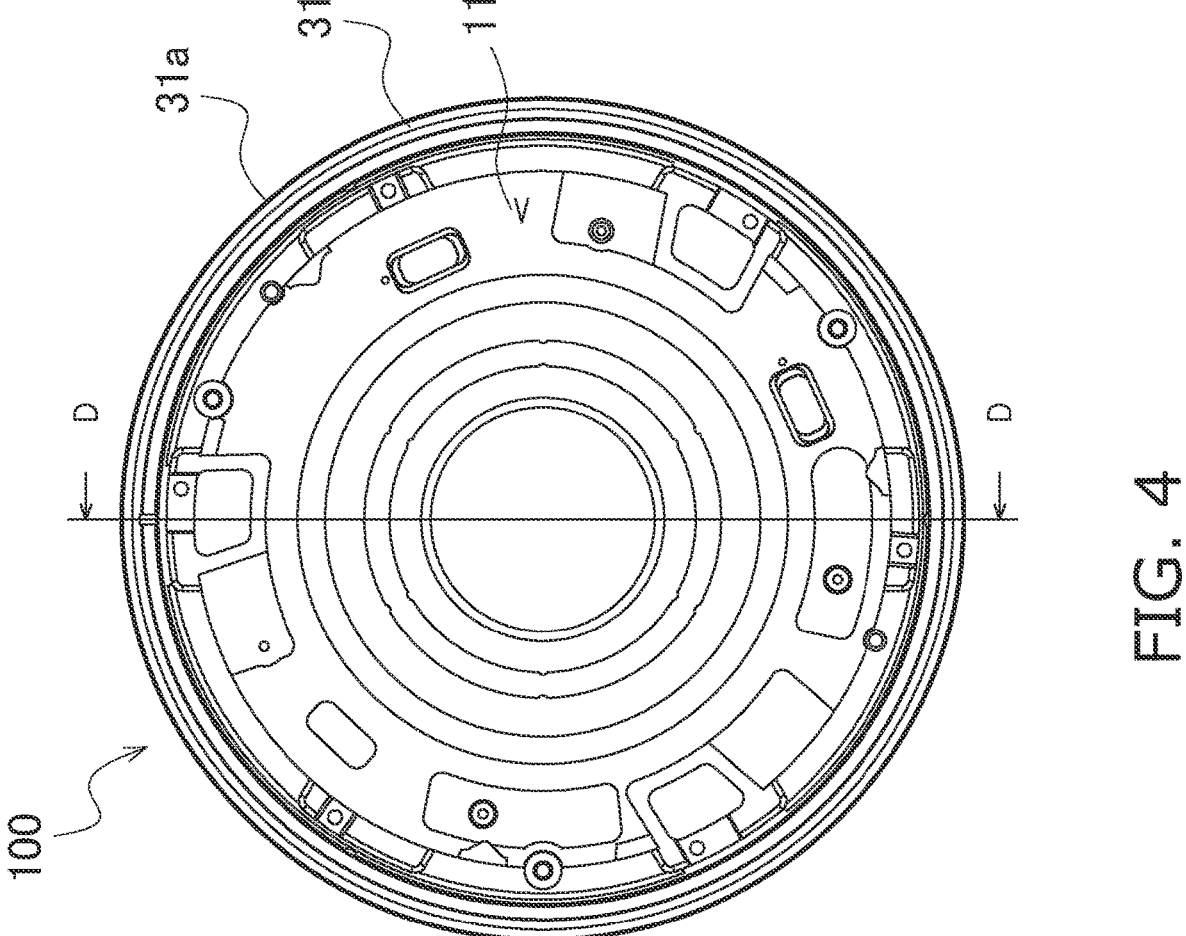
FIG. 4 is a front view of the lens barrel of FIG. 2, as seen from the subject side in the optical axis direction.
Figure 5:
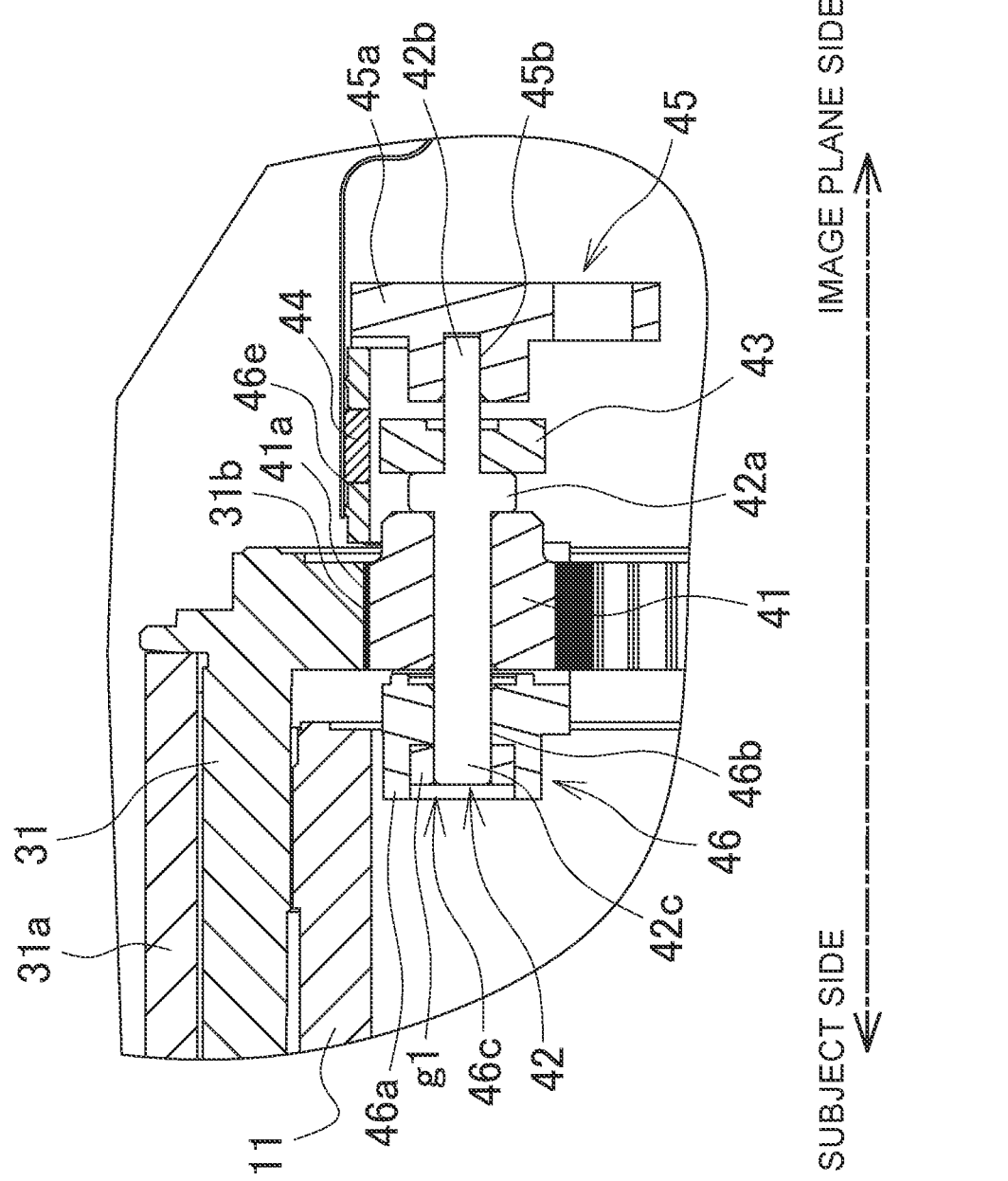
FIG. 5 is a cross-sectional view taken along the D-D line in FIG. 4, and is a detail view of the A portion in FIG. 2.

More specifically, with the lens barrel 100, as shown in FIG. 5, which is a cross-sectional view along the D-D line shown in FIG. 4, and is a detail view of the A portion in FIG. 2, a rubber cover 31*a* is mounted to prevent slipping when the focus ring 31 is rotated.

The focus ring 31 is a substantially annular member, and is rotated to move the fifth lens group unit 25 back and forth in the optical axis OP direction.

Figure 6:
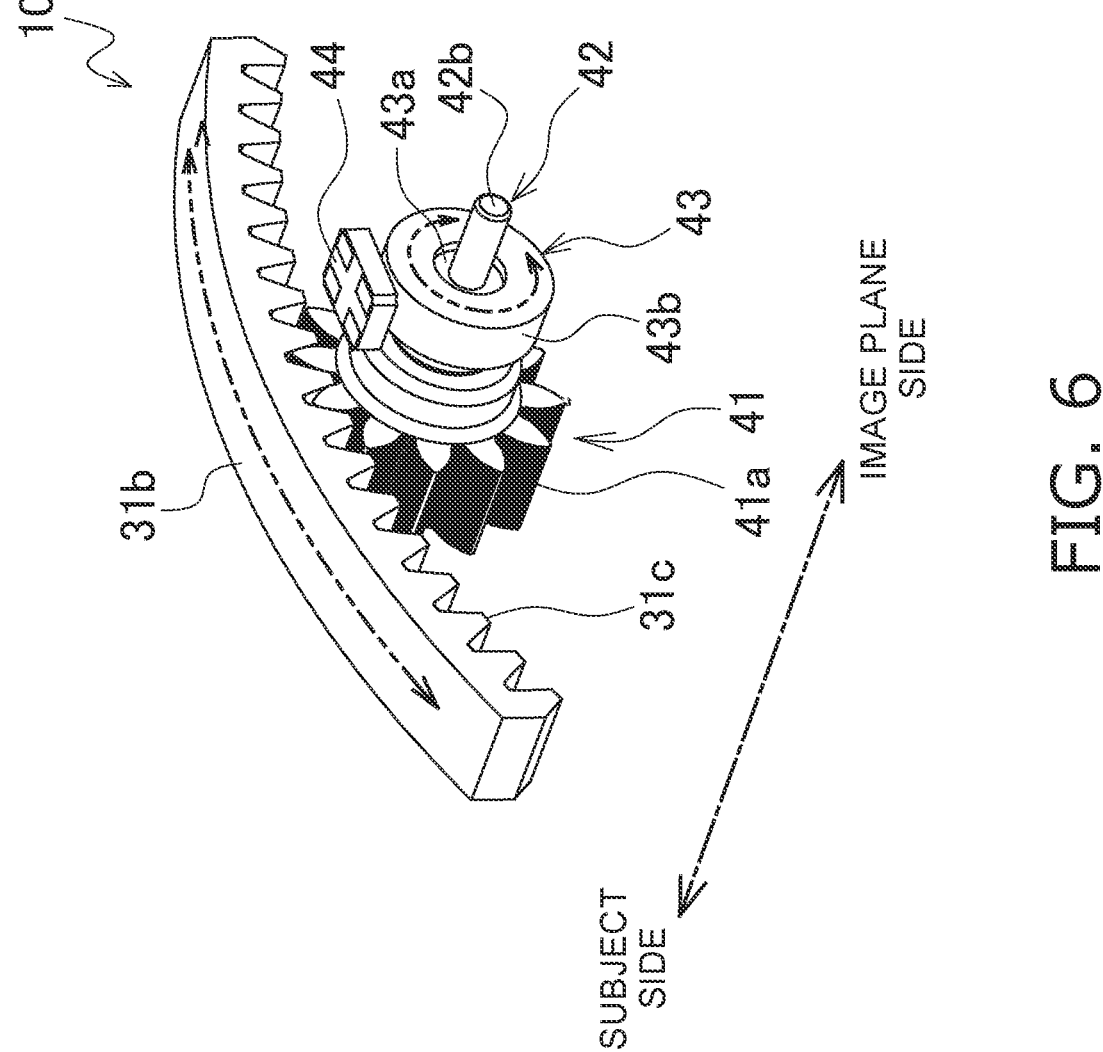
FIG. 6 is an oblique view of the configuration of the main parts included in the A portion in FIG. 5.

As shown in FIGS. 5 and 6, the internal gear (first gear unit) 31*b*, which rotates integrally with the rotation of the focus ring 31, is provided on the inner peripheral surface side of the focus ring 31.

The internal gear 31*b* is provided on the inner peripheral surface side of the focus ring 31, rotates integrally with the focus ring 31, and has a plurality of gear portions (first gear portions) 31*c* that project inward in the radial direction of the focus ring 31, as shown in FIG. 6. The internal gear 31*b* is formed as a substantially arc-shaped member that is fixed to the inner peripheral surface of the focus ring 31, at a length corresponding to the operating range of the focus ring 31.

As shown in FIGS. 5 and 6, the plurality of gear portions 31*c* are provided so as to project inward in the radial direction from the inner peripheral surface of the internal gear 31*b*. The gear portions 31*c* are disposed so as to mesh with the gear portions 41*a* of the pinion gear 41 (discussed below).

Figure 7:
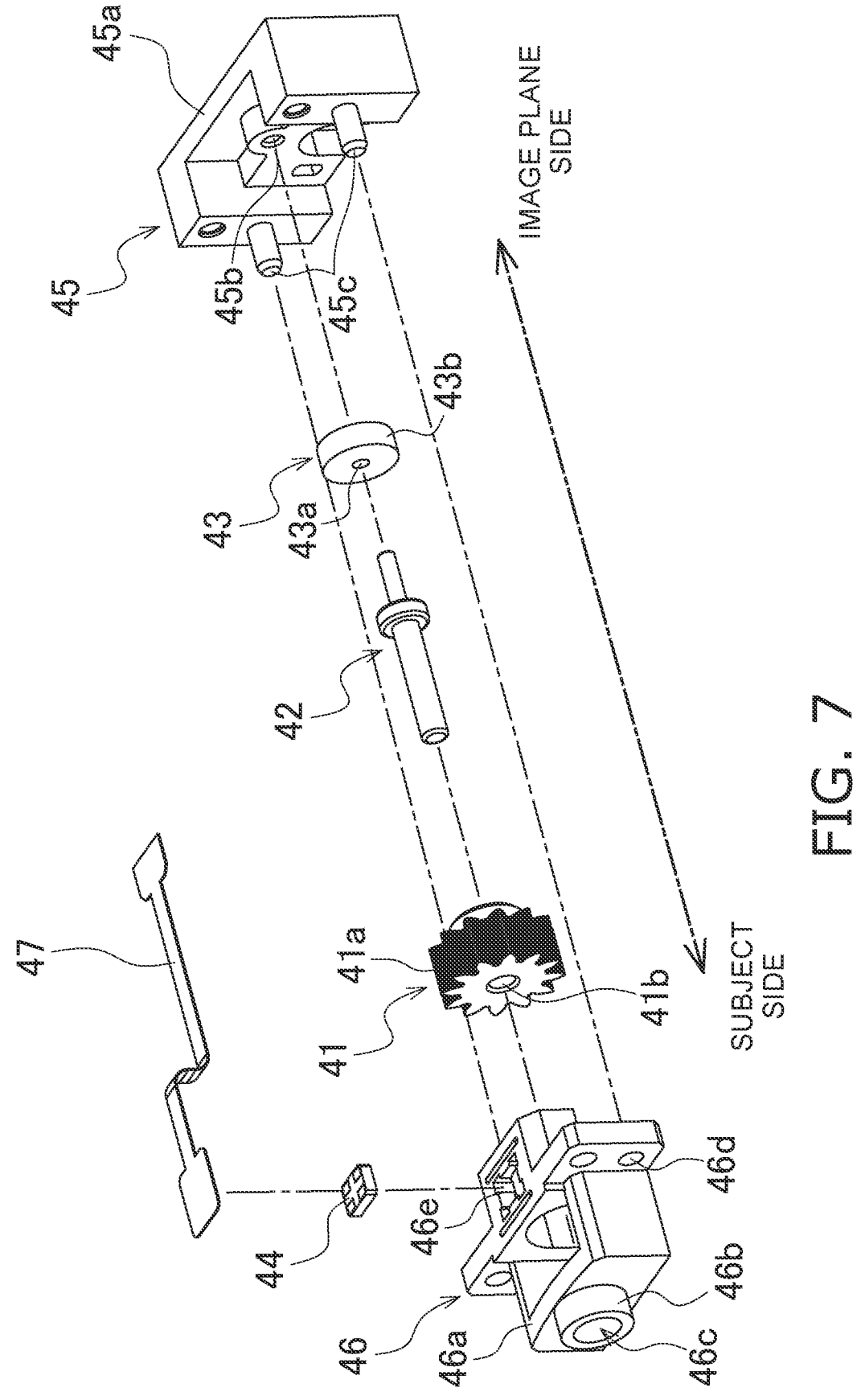
FIG. 7 is an exploded oblique view of the components in FIG. 6.

As shown in FIG. 7, the pinion gear (second gear unit) 41 is a substantially cylindrical gear member, and is provided on the inner peripheral surface side of the internal gear 31*b*, as shown in FIGS. 5 and 6. The pinion gear 41 has a plurality of gear portions (second gear portions) 41*a* that engage with the gear portions 31*c* of the internal gear 31*b*, and a guide shaft 42 that is inserted through the center of the gear portions 41*a*. When the focus ring 31 is rotated, the pinion gear 41 rotates around the guide shaft (rotating shaft) 42 inserted into a through-hole 41*b*, along with the rotation of the internal gear 31*b* that rotates integrally with the focus ring 31.

The plurality of gear portions 41*a* protrude outward in the radial direction from the outer peripheral surface of the substantially cylindrical pinion gear 41, and are formed at the same pitch as the gear portions 31*c* of the internal gear 31*b*.

As shown in FIG. 5, the end (second end 42*c*) on the subject side of the guide shaft 42 (discussed below) is inserted into the through-hole 41*b*.

The pinion gear 41 rotates integrally with the guide shaft 42 in a state in which the second end 42*c* of the guide shaft 42 is inserted into the through-hole 41*b*.

Figure 8:
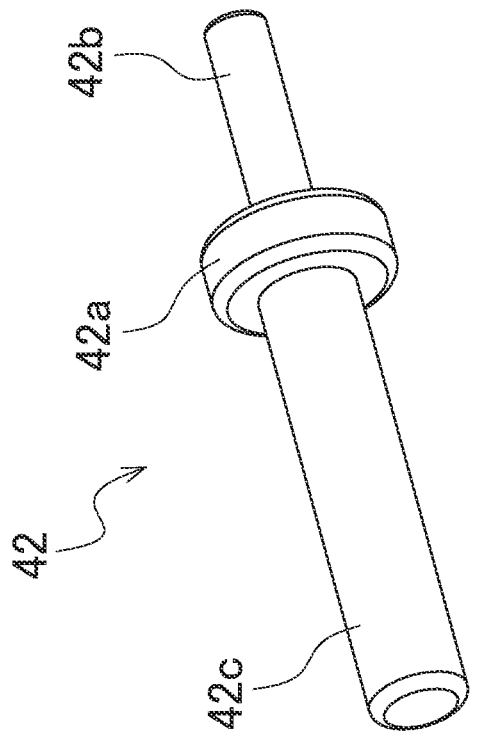
FIG. 8 is an oblique view of the configuration of a guide shaft included in the parts in FIG. 7.

As shown in FIG. 7, the guide shaft 42 is inserted into through-holes 41*b* and 43*a* provided at the center of the pinion gear 41 and the detection magnet 43 (discussed below), and is provided as the rotating shaft of the pinion gear 41 and the detection magnet 43. As shown in FIG. 8, the guide shaft 42 has a large diameter portion 42*a*, a first end 42*b*, and a second end 42*c*.

As shown in FIG. 8, the large diameter portion 42*a* is provided in the approximate middle of the guide shaft 42 and has an outside diameter that is larger than the outside diameters on the first end 42*b* side and the second end 42*c* side. As shown in FIG. 5, the large diameter portion 42*a* is disposed so that the pinion gear 41 comes into contact with the end surface on the subject side, and the detection magnet 43 comes into contact with the end surface on the image plane side.

Consequently, the large diameter portion 42*a* allows the pinion gear 41 and the detection magnet 43 to be positioned with respect to the guide shaft 42.

As shown in FIGS. 5 and 8, the first end 42*b* is located closer to the image plane side than the large diameter portion 42*a*, and has a smaller outside diameter than the second end 42*c*. As shown in FIG. 5, the first end 42*b* is rotatably supported by a first bearing portion 45 disposed on the image plane side.

As shown in FIGS. 5 and 8, the second end 42*c* is located closer to the subject side than the large diameter portion 42*a*, and has a larger outside diameter than the first end 42*b*. As shown in FIG. 5, the second end 42*c* is rotatably supported by a second bearing portion 46 disposed on the subject side.

Also, when the focus ring 31 is rotated, the guide shaft 42 rotates in a state of being integrated with the pinion gear 41 and the detection magnet 43, which rotate in conjunction with the rotation of the internal gear 31*b* with which the focus ring 31 is integrated. At this point, the guide shaft 42 rotates in a state in which the first end 42*b* is supported by the first bearing portion 45 and the second end 42*c* is supported by the second bearing portion 46.

As shown in FIG. 7, the guide shaft 42 is inserted into the detection magnet 43, and the detection magnet 43 rotates integrally with the pinion gear 41. The detection magnet 43 has a through-hole 43*a* into which the guide shaft 42 is inserted, and a magnetized surface 43*b* on which different magnetic poles (N pole and S pole) are alternately magnetized.

As shown in FIG. 7, the through-hole 43*a* is formed in the central portion of the substantially cylindrical detection magnet 43, into which the narrow second end 42*c* of the guide shaft 42 is inserted.

Figure 9:
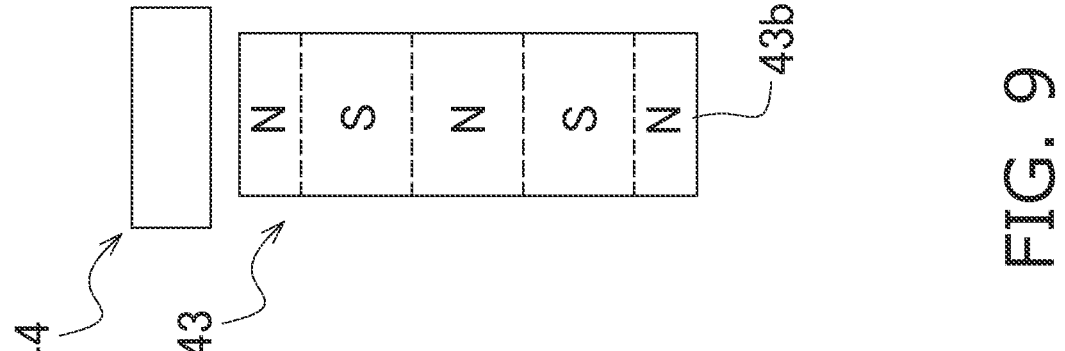
FIG. 9 is a schematic diagram showing the layout of a detection magnet and an MGR sensor included in the parts in FIG. 7.

On the magnetized surface 43*b*, as shown in FIG. 9, N poles and S poles are alternately disposed in the circumferential direction of the substantially cylindrical detection magnet 43.

When the detection magnet 43 rotates in the state shown in FIG. 9, the GMR sensor 44 disposed at a position near the magnetized surface 43*b* detects the rotation of the detection magnet 43, that is, the rotation of the internal gear 31*b* via the rotation of the pinion gear 41 that is integrated via the guide shaft 42, and as a result, the rotational position of the focus ring 31 integrated with the internal gear 31*b* can be sensed.

As shown in FIGS. 5 and 6, the GMR sensor (rotation sensor) 44 is provided at a position adjacent to the magnetized surface 43*b* of the detection magnet 43, and senses the rotation of the detection magnet 43 that rotates along with the pinion gear 41. Consequently, a position sensing unit 52 (see FIG. 10) (discussed below) can sense the rotational position of the focus ring 31 that has been rotated, on the basis of the sensing result of the GMR sensor 44.

As shown in FIGS. 5 and 7, the GMR sensor 44 is fixed to a member (second bearing portion 46) that is separate from the detection magnet 43.

Consequently, since the detection magnet 43 and the GMR sensor 44 are attached to separate members, the resolution of rotation sensing can be improved without making the structure complicated.

Furthermore, the GMR sensor 44 is disposed outside the detection magnet 43 in the radial direction around the optical axis OP of the fifth lens group lens L5 held by the fifth lens group unit 25.

Consequently, compared to a configuration in which the GMR sensor 44 is disposed on the inside in the radial direction of the lens barrel 100, the wiring for transmitting the sensing result of the GMR sensor 44 can be routed more easily.

As shown in FIG. 5, the first bearing portion 45 rotatably supports the first end 42*b* of the guide shaft 42. As shown in FIG. 7, the first bearing portion 45 has a main body portion 45*a*, a shaft support portion 45*b* into which is inserted the first end 42*b* of the guide shaft 42 to which the detection magnet 43 is mounted, and protrusions 45*c* that are used for positioning on the second bearing portion 46 side.

As shown in FIG. 7, the main body portion 45*a* is a substantially U-shaped member, and has a support portion 45*b* and a protrusions 45*c* on its surface on the subject side.

The shaft support portion 45*b* supports one end of the guide shaft 42 in a state in which the first end 42*b* of the guide shaft 42, to which the detection magnet 43 is mounted, is inserted therein.

The protrusions 45*c* are two members used for positioning on the second bearing portion 46 side, and are inserted into two insertion holes 46*d* on the second bearing portion 46 side, thereby positioning the first bearing portion 45 with respect to the second bearing portion 46.

As shown in FIG. 5, the second bearing portion 46 rotatably supports the second end 42*c* of the guide shaft 42. As shown in FIG. 7, the second bearing portion 46 has a main body portion 46*a*, a shaft support portion 46*b*, a filling space 46*c*, and an insertion hole 46*d*.

As shown in FIG. 7, the main body portion 46*a* has the pinion gear 41 disposed on the image plane side, and holds the GMR sensor 44 in a concave portion 46*e* formed on its upper surface. This allows the GMR sensor 44 to be disposed directly above the detection magnet 43.

As shown in FIG. 7, a filling space 46*c* for holding grease g1 is provided to the end surface of the main body 46*a* on the subject side.

The shaft support portion 46*b* supports one end of the guide shaft 42 in a state in which the second end 42*c* of the guide shaft 42, to which the pinion gear 41 is mounted, is inserted.

As shown in FIG. 7, the filling space 46*c* is formed around the guide shaft 42 in the second bearing portion 46, in a plane that is perpendicular to the guide shaft 42, and is filled with grease (highly viscous substance) g1. The filling space 46*c* has a substantially cylindrical shape that is substantially concentric and is centered on the guide shaft 42. The filling space 46*c* is provided on the end surface of the second bearing portion 46 on the opposite side from the pinion gear 41.

In the filling space 46*c*, as shown in FIG. 5, the second end 42*c* of the guide shaft 42 is covered with the grease g1 in a state in which the second end 42*c* protrudes.

Also, the second end 42*c* provided so as to protrude into the filling space 46*c* has a textured surface.

As a result, the contact area between the second end 42*c* of the guide shaft 42 and the grease g1 filled in the filling space 46*c* increases, and the second end 42*c* covered with the grease g1 more less readily. Therefore, rattling of the guide shaft 42 can be more effectively suppressed by the grease g1 in the filling space 46*c*.

The insertion holes 46*d* are through-holes formed along the optical axis OP direction at both ends of the main body portion 46*a*, and as shown in FIG. 7, positioning of the first bearing portion 45 with respect to the second bearing portion 46 is performed when the protrusions 45*c* of the first bearing portion 45 are inserted.

As shown in FIG. 7, the wiring 47 is electrically connected to the upper surface of the GMR sensor 44 held in the concave portion 46*e* of the second bearing portion 46, and the sensing result of the GMR sensor 44 is transmitted to a lens control unit 50 (discussed below).

Figure 10:
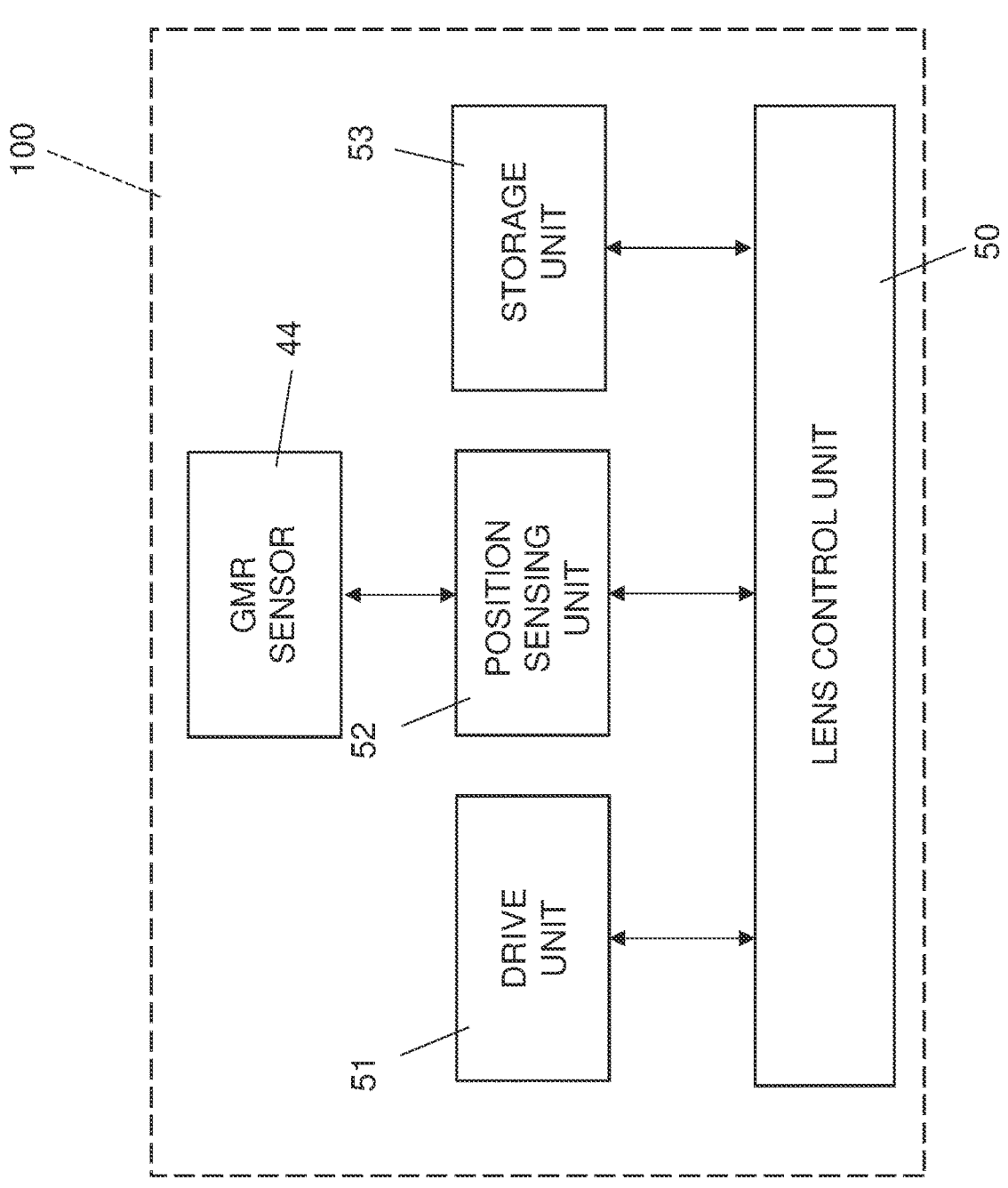
FIG. 10 is a control block diagram of the lens barrel in FIG. 2.

Here, as shown in the control blocks in FIG. 10, the lens barrel 100 of this embodiment mainly includes the GMR sensor 44, a lens control unit 50, a drive unit 51, a position sensing unit 52, and a storage unit 53. The sensing result of the GMR sensor 44 is transmitted to the position sensing unit 52 through the wiring 47.

The position sensing unit 52 senses the rotational position of the focus ring 31 on the basis of the received sensing result of the GMR sensor 44, and transmits this position to the lens control unit 50.

The lens control unit 50 adjusts the position of the lens by controlling the drive unit 51 (such as a motor) provided inside the lens barrel 100, according to the rotational position of the focus ring 31 sensed by the position sensing unit 52.

As discussed above, with the lens barrel 100 of this embodiment, the GMR sensor 44 is employed as a sensing system for the manually operated focus ring 31, and the transmission of the drive force that accompanies the rotational operation of the focus ring 31 is configured by a combination of gears (the internal gear 31*b* and the pinion gear 41).

Consequently, the manual focus sensing resolution can be increased by the amount obtained by multiplying the number of detection pulses of the detection magnet 43 by the gear ratio of the pinion gear 41.

On the other hand, increasing the sensing resolution may sometimes result in erroneous signal detection in situations not intended by the user, because of backlash between the gear portions 31c and 41a or looseness between the first end 42b and second end 42c of the guide shaft 42 and the first and second bearing portions 45 and 46.

In view of this, with the lens barrel 100 of this embodiment, the second bearing portion 46 is provided with the filling space 46c (grease reservoir) for holding the highly viscous grease g1, as a way of dealing with the above problems.

Consequently, erroneous detection caused by backlash between the gear portions 31c and 41a or looseness between the first end 42b and second end 42c of the guide shaft 42 and the first and second bearing portions 45 and 46 can be prevented.

Main Features

As discussed above, the lens barrel 100 of this embodiment includes the fifth lens group unit 25, the focus ring 31, the internal gear 31b, the pinion gear 41, the detection magnet 43, and the GMR sensor 44. The fifth lens group unit 25 holds the fifth lens group lens L5, and moves back and forth in the optical axis direction. The focus ring 31 is a substantially annular member, and is rotated to move the fifth lens group unit 25 in the optical axis direction. The internal gear 31b is provided on the inner peripheral surface side of the focus ring 31, rotates integrally with the focus ring 31, and has a plurality of gear portions 31c protruding inward in the radial direction of the focus ring 31. The pinion gear 41 is provided on the inner peripheral surface side of the focus ring 31, and has gear portions 41a that mate with the gear portions 31c of the internal gear 31b, and a guide shaft 42 that is inserted through the center of the gear portions 41a. The guide shaft 42 is inserted into the detection magnet 43, and the detection magnet 43 rotates integrally with the gear portion 41a and has a magnetized surface 43b on which different magnetic poles are magnetized alternately. The GMR sensor 44 is fixed to a member separate from the detection magnet 43, is provided at a position adjacent to the detection magnet 43, and senses the rotation of the detection magnet 43 rotating along with the pinion gear 41.

Consequently, by sensing the rotation of the detection magnet 43 by using the sensing result of the GMR sensor 44 allows the rotational position of the focus ring 31, which rotates integrally with the internal gear 31b that meshes and rotates with the gear portions 41a of the pinion gear 41 along with the rotation of the pinion gear 41, which rotates integrally with the detection magnet 43, to be sensed very accurately.

Furthermore, since the GMR sensor 44 is attached to a member separate from the detection magnet 43, the rotation sensing resolution can be improved with a simple configuration, without providing any dedicated component.

Also, the rotational position sensing device 10 of this embodiment is attached to the lens barrel 100 described above, and senses the rotational position of the focus ring 31. The lens barrel 100 includes the fifth lens group unit 25 that holds a lens and is able to move back and forth in the direction of the optical axis OP, and the focus ring 31, which is a substantially annular member that is rotated to move the fifth lens group unit 25 in the direction of the optical axis OP. The rotational position sensing device 10 includes the internal gear 31b, the pinion gear 41, the detection magnet 43, and the GMR sensor 44, as shown in FIG. 6. The internal gear 31b is provided on the inner peripheral surface side of the focus ring 31, rotates integrally with the focus ring 31, and has a plurality of gear portions 31c that protrude inward in the radial direction of the focus ring 31. The pinion gear 41 is provided on the inner peripheral surface side of the focus ring 31, and has the gear portions 41a that mate with the gear portions 31c of the internal gear 31b, and a guide shaft 42 that is inserted through the center of the gear portions 41a. The guide shaft 42 is inserted into the detection magnet 43, and the detection magnet 43 rotates integrally with the gear portion 41a and has the magnetized surface 43b on which different magnetic poles are magnetized alternately. The GMR sensor 44 is fixed to a member separate from the detection magnet 43, is provided at a position adjacent to the detection magnet 43, and senses the rotation of the detection magnet 43 rotating along with the pinion gear 41.

Consequently, by using the sensing result of the GMR sensor 44 to sense the rotation of the detection magnet 43, the rotational position of the focus ring 31, which rotates integrally with the internal gear 31b that meshes and rotates with the gear portions 41a of the pinion gear 41 along with the rotation of the pinion gear 41 rotating integrally with the detection magnet 43, can be sensed very accurately.

Furthermore, since the GMR sensor 44 is attached to a member separate from the detection magnet 43, the rotation sensing resolution can be improved with a simple configuration without providing any dedicated component.

Also, as discussed above, the lens barrel 100 of this embodiment includes the fifth lens group unit 25, the focus ring 31, the internal gear 31b, and the pinion gear 41. The fifth lens group unit 25 holds the fifth lens group lens L5 and moves back and forth in the optical axis direction. The focus ring 31 is a substantially annular member, and is rotated to move the fifth lens group unit 25 in the optical axis direction. The internal gear 31b is provided on the inner peripheral surface side of the focus ring 31, rotates integrally with the focus ring 31, and has a plurality of gear portions 31c protruding inward in the radial direction of the focus ring 31. The pinion gear 41 is provided on the inner peripheral surface side of the focus ring 31, and has the gear portion 41a that mate with the gear portions 31c of the internal gear 31b, and a guide shaft 42 that is inserted through the center of the gear portions 41a. The guide shaft 42 has a first end 42b and a second end 42c on the opposite side from the first end 42b. The pinion gear 41 has a first bearing portion 45 that supports the first end 42b of the guide shaft 42, a second bearing portion 46 that supports the second end 42c, and a filling space 46c that is formed in a plane that is perpendicular to the guide shaft 42 in the second bearing portion 46, and is filled with the grease g1.

Consequently, even if the guide shaft 42 is loose, the viscosity of the grease g1 in the filling space 46c so as to cover the tip of the second end 42c of the guide shaft 42 will effectively suppress any looseness of the guide shaft 42.

Therefore, in the lens barrel 100 equipped with the GMR sensor 44, which has high sensing resolution, as in this embodiment, it is possible to effectively suppress erroneous detection attributable to looseness of the guide shaft 42.

Other Embodiments

An embodiment of the present disclosure was described above, but the present disclosure is not limited to the above embodiment, and various modifications are possible without departing from the gist of the disclosure.

(A)

In the above embodiment, an example was given in which the present disclosure was applied to the focus ring 31 as the manual operation ring. However, the present disclosure is not limited to this.

For example, just as with the focus ring, the same effect as described above can be obtained when the present disclosure is applied to a zoom ring.

(B)

In the above embodiment, an example was given in which the pinion gear 41 and the detection magnet 43 were disposed on the subject side and the image plane side, respectively, in the optical axis OP direction, via the large diameter portion 42a of the guide shaft 42 has been described. However, the present disclosure is not limited to this.

For example, the pinion gear (second gear unit) and the detection magnet may be disposed the other way around in the optical axis direction.

(C)

In the above embodiment, an example was given in which the pinion gear 41 and the detection magnet 43 were positioned in the optical axis OP direction by the large diameter portion 42a provided in the approximate middle of the guide shaft 42. However, the present disclosure is not limited to this.

For example, the guide shaft serving as the center of rotation of the detection magnet and the pinion gear (second gear unit) may be configured not to have a large diameter portion.

(D)

In the above embodiment, an example was given in which the filling space 46c filled with the grease g1 (as a highly viscous substance) had a substantially cylindrical shape that was concentric with the guide shaft 42. However, the present disclosure is not limited to this.

For example, the shape of the filling space to be filled with a highly viscous substance such as grease may be a shape other than a substantially cylindrical shape that is concentric with the guide shaft (rotating shaft).

(E)

In the above embodiment, an example was given in which the grease g1 was used as the highly viscous substance that filled the filling space 46c in order to suppress looseness of the guide shaft 42. However, the present disclosure is not limited to this.

For example, instead of grease, the filling space may be filled with some other highly viscous substance, such as high-viscosity oil.

(F)

In the above embodiment, an example was given in which texturing was performed on the surface of the second end 42c of the guide shaft 42 disposed in the grease g1 of the filling space 46c, in order to suppress looseness of the guide shaft 42. However, the present disclosure is not limited to this.

For example, instead of texturing, some other surface treatment may be used to increase the contact area with the highly viscous substance.

Alternatively, the configuration may be such that the second end of the guide shaft (rotating shaft) is not subjected to texturing or other such surface treatment. Here again, the highly viscous substance that covers the second end can effectively suppress looseness of the guide shaft (rotating shaft).

(G)

In the above embodiment, an example was given in which the first end 42b and the second end 42c of the guide shaft 42 were formed to have different thicknesses (outside diameters). However, the present disclosure is not limited to this.

For example, the guide shaft (rotating shaft) may have substantially the same thickness (outside diameter) at the first end and the second end.

Alternatively, the guide shaft (rotating shaft) may have a first end that is thicker than its second end.

(H)

In the above embodiment, an example was given in which the present disclosure was applied to the lens barrel 100 that had been detachably attached to the camera body 101. However, the present disclosure is not limited to this.

For example, the present disclosure may be applied to a lens barrel that is permanently fixed to a camera body.

INDUSTRIAL APPLICABILITY

An effect of the lens barrel of the present disclosure is that the resolution of rotation sensing can be improved without making the structure complicated, and is therefore broadly applicable to various kinds of lens barrel equipped with a sensor for sensing a rotational position.

REFERENCE SIGNS LIST

1 camera
10 rotation position sensing device
11 rectilinear barrel (fixed barrel)
12 cam barrel
21 first lens group unit
21a main body portion
21b cam follower
22 second lens group unit
23 third lens group unit
24 fourth lens group unit
25 fifth lens group unit (movable lens frame)
26 sixth lens group unit
27 seventh lens group unit
31 focus ring (manual operation ring)
31a cover
31b internal gear (first gear unit)
31c gear unit (first gear unit)
32 zoom ring
32a main body portion
32b pin insertion hole
32c rectilinear restriction groove
32d zoom ring rubber
33 zoom drive pin
34 base frame
41 pinion gear (second gear unit)
41a gear portion (second gear portion)
41b through-hole
42 guide shaft (rotating shaft)
42a large diameter part
42b first end
42c second end
43 detection magnet
43a through-hole
43b magnetized surface
44 GMR sensor (rotation sensor)
45 first bearing portion
45a main body portion
45b shaft support portion
45c protrusion
46 second bearing portion
46a main body portion
46b shaft support portion
46c filling space
46d insertion hole 46*e* concave portion
47 wiring
50 lens control unit
51 drive unit
52 position sensing unit
53 storage unit
100 lens barrel
101 camera body
g1 grease (highly viscous substance)
L1 to L7 first to seventh lens groups
OP optical axis

The invention claimed is:

1. A lens barrel, comprising:
a movable lens frame that holds a lens and is configured to move back and forth in an optical axis direction;
a manual operation ring that is a substantially annular member and is configured to be rotated to move the movable lens frame in the optical axis direction;
a first gear unit that is provided on an inner peripheral surface side of the manual operation ring, and is configured to rotate integrally with the manual operation ring, and has a plurality of first gear portions that project inward in a radial direction of the manual operation ring;
a second gear unit that is provided on an inner peripheral surface side of the first gear unit and has a second gear portion that mates with the first gear portion of the first gear unit, and a rotating shaft that is inserted through a center of the second gear portion;
a detection magnet into which the rotating shaft is inserted and configured to rotate integrally with the second gear portion and has a magnetized surface on which different magnetic poles are magnetized alternately; and
a rotation sensor that is fixed to a member separate from the detection magnet, is provided at a position adjacent to the detection magnet, and is configured to sense a rotation of the detection magnet that rotates along with the second gear portion.

2. The lens barrel according to claim 1,
wherein the rotating shaft has a first end on a side where the rotation sensor is disposed, and a second end on an opposite side from the first end, and
the second gear unit further has a first bearing portion configured to support the first end of the rotating shaft, a second bearing portion configured to support the second end, and a filling space that is formed around the rotating shaft in the second bearing portion and is filled with a highly viscous substance.

3. The lens barrel according to claim 2,
wherein the filling space is provided at an end surface of the second bearing portion on an opposite side from the second gear portion.

4. The lens barrel according to claim 2,
wherein, in the filling space, in a state in which the second end of the rotating shaft is protruding, the second end is covered by the highly viscous substance.

5. The lens barrel according to claim 4,
wherein the second end provided so as to protrude into the filling space has a larger diameter than the first end.

6. The lens barrel according to claim 4,
wherein the second end provided so as to protrude into the filling space has a textured surface.

7. The lens barrel according to claim 2,
wherein the filling space has a substantially cylindrical shape that is substantially concentric centered on the rotating shaft.

8. The lens barrel according to claim 1,
further comprising a position sensor configured to sense a rotational position of the manual operation ring on the basis of a detection pulse sensed by the rotation sensor and a gear ratio of the first gear portion and the second gear portion.

9. The lens barrel according to claim 1,
wherein the rotating shaft has a small diameter portion that is inserted through the second gear portion and the detection magnet, and a large diameter portion whose outside diameter is larger than that of the small diameter portion, and
the second gear portion and the detection magnet are attached to the rotating shaft so as to sandwich the large diameter portion.

10. The lens barrel according to claim 1,
wherein the rotation sensor is disposed outside the detection magnet in a radial direction centered on the optical axis of the lens held by the movable lens frame.

11. A camera, comprising:
the lens barrel according to claim 1; and
a camera body to which the lens barrel is mounted.

12. A rotational position sensing device that senses a rotational position of a manual operation ring and is attached to a lens barrel, the lens barrel comprising:
a movable lens frame that holds a lens and is configured to move back and forth in an optical axis direction; and
a manual operation ring that is a substantially annular member and is configured to be rotated to move the movable lens frame in the optical axis direction,
the rotational position sensing device comprising:
a first gear unit that is provided on an inner peripheral surface side of the manual operation ring, and is configured to rotate integrally with the manual operation ring, and has a plurality of first gear portions that project inward in a radial direction of the manual operation ring;
a second gear unit that is provided on an inner peripheral surface side of the first gear unit and has a second gear portion that mates with the first gear portion of the first gear unit, and a rotating shaft that is inserted through a center of the second gear portion;
a detection magnet into which the rotating shaft is inserted and configured to rotate integrally with the second gear portion and has a magnetized surface on which different magnetic poles are magnetized alternately; and
a rotation sensor that is fixed to a member separate from the detection magnet, is provided at a position adjacent to the detection magnet, and is configured to sense a rotation of the detection magnet that rotates along with the second gear portion.

13. A lens barrel, comprising:
a movable lens frame that holds a lens and is configured to move back and forth in an optical axis direction;
a manual operation ring that is a substantially annular member and is configured to be rotated to move the movable lens frame in the optical axis direction;
a first gear unit that is provided on an inner peripheral surface side of the manual operation ring, and is configured to rotate integrally with the manual operation ring, and has a plurality of first gear portions that project inward in a radial direction of the manual operation ring; and
a second gear unit that is provided on the inner peripheral surface side of the manual operation ring and has a second gear portion that mates with the first gear portion of the first gear unit, and a rotating shaft that is inserted through a center of the second gear portion;

wherein the rotating shaft has a first end and a second end on an opposite side from the first end, and the second gear unit further has a first bearing portion configured to support the first end of the rotating shaft, a second bearing portion configured to support a second end, and a filling space that is formed in a plane perpendicular to the rotating shaft in the second bearing portion and is filled with a highly viscous substance.

14. A camera, comprising:

the lens barrel according to claim 13; and a camera body to which the lens barrel is mounted.

* * * * *